(12) United States Patent
Ostergren et al.

(10) Patent No.: US 7,725,929 B2
(45) Date of Patent: May 25, 2010

(54) SYSTEMS AND METHODS FOR FREE DEMONSTRATION OF ONLINE PREMIUM CONTENT PRIOR TO PURCHASE

(75) Inventors: Brian H. Ostergren, Redmond, WA (US); Eric D. Heutchy, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 11/063,440

(22) Filed: Feb. 22, 2005

(65) Prior Publication Data

US 2006/0191016 A1    Aug. 24, 2006

(51) Int. Cl.
G06F 7/04     (2006.01)
G06F 15/16    (2006.01)
G06F 17/13    (2006.01)
H04L 29/06    (2006.01)

(52) U.S. Cl. .............................. 726/6; 713/2
(58) Field of Classification Search ............ 726/6
See application file for complete search history.

(56) References Cited

U.S. PATENT DOCUMENTS

| | | | | |
|---|---|---|---|---|
| 4,864,494 | A * | 9/1989 | Kobus, Jr. | 726/33 |
| 5,007,082 | A * | 4/1991 | Cummins | 713/164 |
| 5,222,135 | A * | 6/1993 | Hardy et al. | 713/183 |
| 5,363,446 | A * | 11/1994 | Ruppertz et al. | 713/1 |
| 5,410,699 | A * | 4/1995 | Bealkowski et al. | 713/2 |
| 5,421,006 | A | 5/1995 | Jablon et al. | 714/36 |
| 5,652,793 | A | 7/1997 | Priem et al. | 705/56 |
| 5,892,906 | A * | 4/1999 | Chou et al. | 726/19 |
| 5,944,821 | A | 8/1999 | Angelo | 713/200 |
| 6,029,141 | A | 2/2000 | Bezos et al. | 705/27 |
| 6,151,618 | A | 11/2000 | Wahbe et al. | 718/1 |
| 6,161,179 | A * | 12/2000 | Seidel | 713/168 |
| 6,363,356 | B1 | 3/2002 | Horstmann | 705/26 |
| 6,468,160 | B2 | 10/2002 | Eliott | 463/43 |
| 6,493,717 | B1 * | 12/2002 | Junkin | 707/102 |
| 6,633,963 | B1 | 10/2003 | Ellison et al. | 711/163 |
| 6,651,171 | B1 | 11/2003 | England et al. | 713/193 |
| 6,714,921 | B2 | 3/2004 | Stefik et al. | 705/55 |
| 6,745,307 | B2 | 6/2004 | McKee | 711/163 |
| 6,769,989 | B2 | 8/2004 | Smith et al. | 463/41 |

(Continued)

OTHER PUBLICATIONS

Colker, David, "Game Makers to Try Pay-as-You-Go Model," *Los Angeles Times*, Los Angeles, California, May 14, 2004, p. C1.

(Continued)

*Primary Examiner*—Kambiz Zand
*Assistant Examiner*—Dant B Shaifer Harriman
(74) *Attorney, Agent, or Firm*—Woodcock Washburn LLP (57) ABSTRACT

Key-limited use applications are maintained at a central service where the central service can receive requests from a remote computing device for access to the key-limited use applications. The key-limited use applications include publicly available portions and a locked portions accessible with a key. The central service can provide a key to the remote computing device associated with a key-limited use application for complete access. The key can be stored in a memory device associated with the remote computing device. A digital signature can be assigned to the key to prevent operation of the key in a second computing device. Unauthorized or unlicensed computing devices are prevented from using the applications.

20 Claims, 5 Drawing Sheets

U.S. PATENT DOCUMENTS

| | | | |
|---|---|---|---|
| 2002/0007456 A1* | 1/2002 | Peinado et al. | 713/164 |
| 2002/0016846 A1 | 2/2002 | Ono | 709/229 |
| 2002/0129121 A1 | 9/2002 | Reber et al. | 709/219 |
| 2002/0147674 A1* | 10/2002 | Gillman | 705/37 |
| 2002/0150243 A1 | 10/2002 | Craft et al. | 380/201 |
| 2002/0178071 A1 | 11/2002 | Walker et al. | 705/26 |
| 2004/0078305 A1 | 4/2004 | Weller | 705/27 |
| 2006/0048236 A1* | 3/2006 | Multerer et al. | 726/28 |
| 2006/0064761 A1* | 3/2006 | Multerer et al. | 726/27 |
| 2008/0320607 A1* | 12/2008 | Richardson | 726/33 |

OTHER PUBLICATIONS

Corcoran, David, "Muscle Flexes Smart Cards into Linux," *Linux Journal*, Aug. 1998, www.delivery.acm.org, 6 pages.

Fichman, Robert G., et al., "Information-Rich Commerce at a Crossroads: Business and Technology Adoption Requirements," *Communications of the ACM*, vol. 46, Issue 9, Sep. 2003, pp. 96-102.

Gal, Tsvi, et al., "The IP War—Apocalypse or Revolution?" *Proceedings of the 2003 ACM Workshop on Digital Rights Management*, Oct. 2003, pp. 39-46.

Grover, Varun, et al., "The Telecommunication Industry Revisited—The Changing Pattern of Partnerships," *Communications of the ACM*, vol. 46, Issue 7, Jul. 2003, pp. 119-125.

Hauser, Ralf C., "Does Licensing Require New Access Control Techniques?" *Communications of the ACM*, vol. 37, Issue 11, Nov. 1994, pp. 48-55.

Liu, Qiong, et al., "Digital Rights Management for Content Distribution," *Proceedings of the Australasian Information Security Workshop Conference on ACSW Frontiers 2003* —vol. 21, Jan. 2003, 10 pages.

Mjolsnes, Stig Frode, et al., "On-Line E-Wallet System with Decentralized Credential Keepers," *Mobile Networks and Applications*, vol. 8, Issue 1, Feb. 2003, pp. 87-99.

Suh, G. Edward, et al., "AEGIS: Architecture for Tamper-Evident and Tamper-Resistant Processing," *Proceedings of the 17th Annual International Conference on Supercomputing*, Jun. 2003, pp. 160-171.

Yu, Ting, et al., "Interoperable Strategies in Automated Trust Negotiation," *Proceedings of the 8th ACM Conference on Computer and Communications* Security, Nov. 2001, pp. 146-155.

Yu, Ting, et al., "Supporting Structured Credentials and Sensitive Policies through Interoperable Strategies for Automated Trust Negotiation," *ACM Transactions on Information and System Security (TISSEC)*, vol. 6, Issue 1, Feb. 2003, pp. 1-42.

Black, J. et al., "UMAC: Fast and Secure Message Authentication," *Advances in Cryptology—CRYPTO '99*, Lecture Notes in Computer Science, Wiener, M. (ed.), 1999, vol. 1666, 18 pages.

Engler, D. et al., "The Operating System Kernel as a Secure Programmable Machine," *Proceedings of the 6th Workshop on ACM SIGOPS European Workshop: Matching Operating Systems to Application Needs*, Wadern, Germany, 1994, 62-67.

Halevi, S. et al., "A Tweakable Enciphering Mode," *Advances in Cryptology—CRYPTO '03*, Lecture Notes in Computer Science, Boneh, D. (ed.), 2003, vol. 2729, 33 pages.

Jutla, C.S., "Encryption Modes with Almost Free Message Integrity," *Proceedings of the International Conference on the Theory and Application of Cryptographic Techniuqes: Advances in Cryptology*, 2001, 15 pages.

Kirovski, D. et al., "Enabling Trusted Software Integrity," *Proceedings of the 10th International Conference on Architectural Support for Programming Languages and Operating Systems*, San Jose, California, 2002, 108-120.

Lie, D. et al., "Implementing an Untrusted Operating System on Trusted Hardware," *Proceedings of the 19th ACM Symposium on Operating Systems Principles*, Bolton Landing, New York, 2003, 178-192.

Lie, D. et al., "Architectural Support for Copy and Tamper Resistant Software," *ACM SIGPLAN Notices*, 2000, 35(11), 8 pages.

Schroeder, M.D. et al., "A Hardware Architecture for Implementing Protection Rings," *Communications of the ACM*, Mar. 1972, 15(3), 157-170.

Suh, G.E. et al., "Hardware Mechanisms for Memory Integrity Checking," *MIT Laboratory for Computer Science*, 2002, 18 pages.

Suh, G. E. et al., "Efficient Memory Integrity Verification and Encryption for Secure Processors," *Proceedings of the 36th International Symposium on Microarchitecture*, 2003, 1-12.

Wetzel, J. et al., "PowerPC Operating Environment Architecture," Dec. 2003, *Book III, Version 2.01*, Table of Contents and pp. 1-119.

Wu, M. et al., "Improving TLB Miss Handling with Page Table Pointer Caches," Dec. 1997, 10 pages.

Zachary, J. et al., "Bidirectional Mobile Code Trust Management Using Tamper Resistant Hardware," *Mobile Networks and Applications*, 2003, 8, 137-143.

\* cited by examiner

SYSTEMS AND METHODS FOR FREE DEMONSTRATION OF ONLINE PREMIUM CONTENT PRIOR TO PURCHASE

FIELD OF THE INVENTION

The present invention is directed to controlling the distribution of software, and more particularly, to licensing the use of software.

BACKGROUND OF THE INVENTION

Protecting rights of digital content, such as software, has become increasingly difficult in this digital age. Unauthorized copying and sharing of software is rampant.

One popular approach for protecting rights of digital content is the use of a digital rights management (DRM) system. Conventional DRM systems typically include at least two parties: a content provider and a rights entity. In operation, the user registers with the rights entity and obtains a decryption means. When the user requests digital content from the content provider, the digital content is sent to the user as an encrypted file. The digital content in the file can be accessed after the file has been decrypted using the decryption means.

Conventional DRM systems work well for protecting digital content that is strictly data in nature. Digital data such as music files and video files can be protected using a variety of encryption schemes. However, encryption does not work well for protecting computer software. Unlike data, computer programs are designed to perform operations and often require installation. It is not efficient to use encryption to protect a computer program due to architectural complexity and extraneous operation overhead associated with the required decryption mechanisms.

Currently, with respect to software that is stored on physical media, such as a disk, the license to use the software is implied to travel with the media itself. Because of this, many users who are not rightfully licensed to use the software may use the software, while being either unaware of the need for a license or willfully ignoring the need for a license. For example, in some high piracy regions, a user is able to purchase unauthorized disks containing copies of computer software. Because the user has purchased a disk containing the software, there is an implication, at least to the user, that the software is properly licensed, regardless of whether or not a proper license has actually been procured. This pirated software may be run on any appropriate computer without the user procuring a license to use that software. It would be desirable to prevent the use of software without a proper license and to separate the delivery of the license to use software from the delivery of the media containing the software.

That being said, some conventional methods prevent unauthorized distribution of a computer-executable program by encrypting the entire file containing the program. The encrypted file is then transmitted to an intended user who has been given the proper decryption means. After the file has been transmitted, the user has to decrypt the file before installing and using the program. However, once the program has been decrypted, the program is no longer protected from unauthorized use and transfer to other devices.

Effective and efficient systems and methods for controlling illegal distribution and licensing of computer software eludes those skilled in the art.

SUMMARY OF THE INVENTION

The present invention is directed to licensing the use of software on a particular central processing unit (CPU) residing on a computing device. An unlock code or key is provided to the computing device (either directly or via a user), which in turn, unlocks the appropriate software (or features of software) residing on, or being used in conjunction with, the computing device. For example, the software may be resident on a computer-readable medium, such as a disk, that has been provided to the computing device.

According to an embodiment of the invention, a method for acquiring access to an application having a locked feature comprises launching the application having a restricted mode and an unlocked mode on a computer device, determining whether a key is present on the computer device, and if the key is present, then running the application in the unlocked mode, and otherwise, running the application in the restricted mode.

According to various aspects of the invention, the unlock code or key desirably may be based on a unique identifier of the software application seeking to be accessed and may be provided after payment or another condition is satisfied. The unlock code or key is desirably only usable for the particular computing device because a digital signature for the specific computing device is applied to the key upon delivery. Therefore, the software that has been unlocked cannot be used on second computing device without authorization.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Applications may be licensed for use on a particular computing device, or more particularly, a CPU on a computing device, such as a gaming console or a multimedia console. A user can download a key-limited use application or obtain a copy of the key-limited use application on a computer readable medium (e.g. CD-ROM, DVD, etc.) as a trial version. An unlock code or key can be provided from a central service to a computing device either directly or via a user. The unlocking code may be provided directly to the user (e.g., the Internet, via email, mobile phone). The unlocking code may unlock the entire application or portions thereof (e.g., a particular level of a game or other features such as additional characters or weapons), pending the license agreement.

The unlock code or key may be desirably based on a unique identifier associated with the software seeking to be accessed. The unlock code or key may only be used by a single computing device, thereby preventing unauthorized or unlicensed computing devices from using the software. Therefore, the delivery of the software bits is separated from the permission to run the collective software bits.

Exemplary Computing Environment

Figure 1:
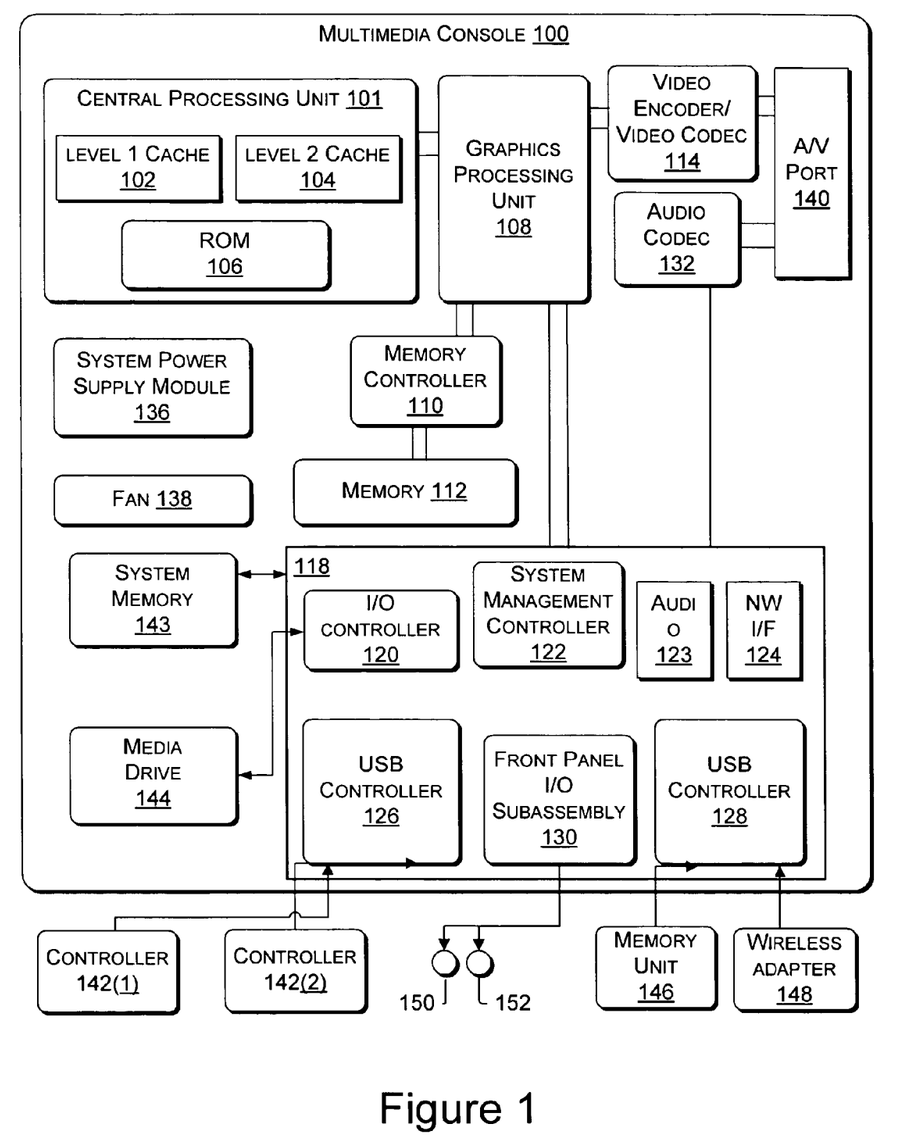
FIG. 1 is a block diagram showing a multimedia console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128, and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications, and drivers. The CPU reservation is preferably maintained at a constant level.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of game resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus multimedia application threads. The system applications are preferably scheduled to run on the CPU 101 at predetermined times and intervals in order to provide a consistent system resource view to the application. The scheduling is to minimize cache disruption for the multimedia application running on the console.

When a concurrent system application requires audio, audio processing is scheduled asynchronously to the multimedia application due to time sensitivity. A multimedia console application manager controls the multimedia application audio level (e.g., mute, attenuate) when system applications are active.

Input devices (e.g., controllers 142(1) and 142(2)) are shared by multimedia applications and system applications. The input devices are not reserved resources, but are to be switched between system applications and the multimedia application such that each will have a focus of the device. The application manager preferably controls the switching of input stream, without knowledge the multimedia application's knowledge and a driver maintains state information regarding focus switches.

Exemplary Embodiments

Figure 2:
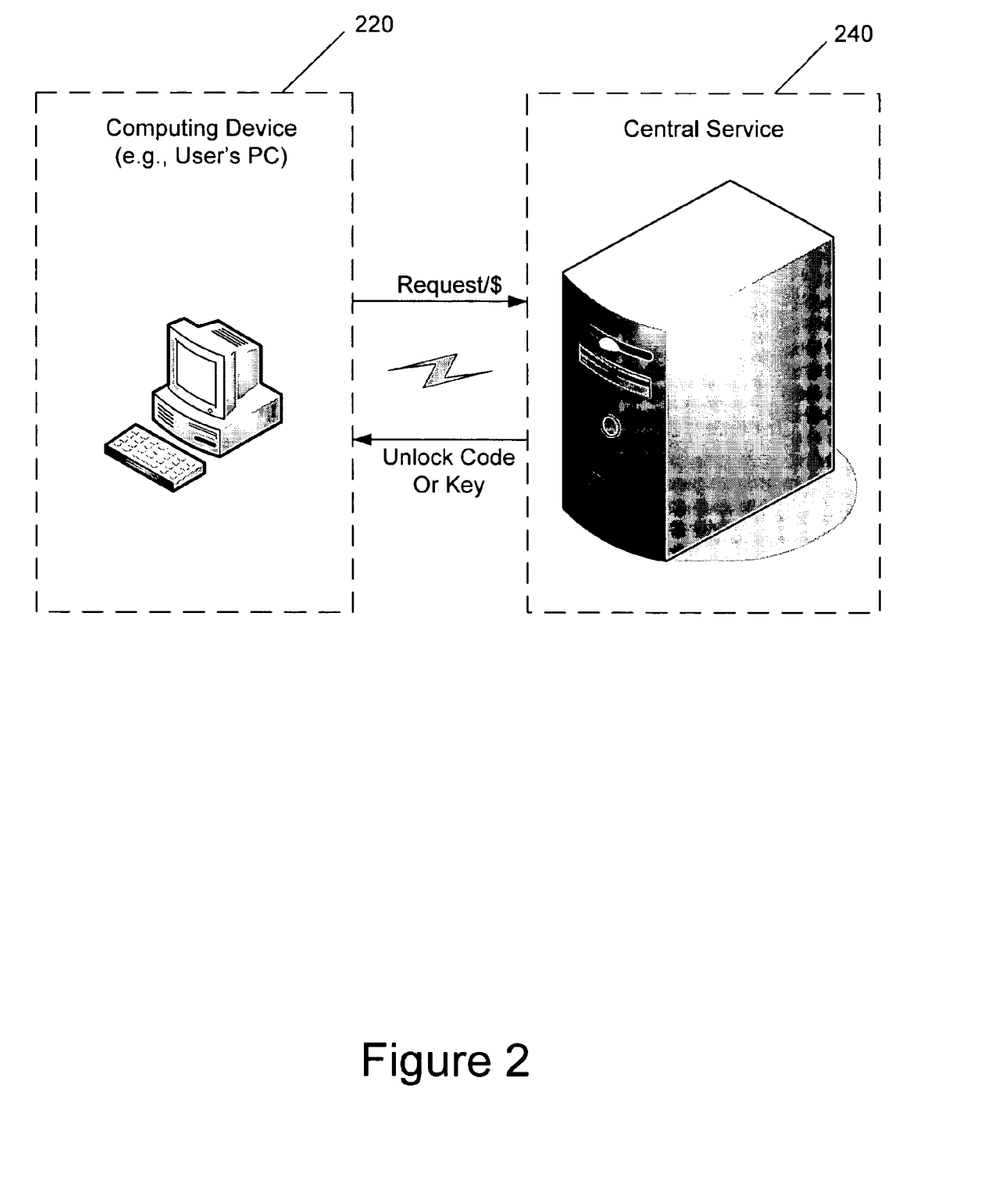
FIG. 2 is a block diagram of an exemplary object unlock code control system in accordance with the present invention.

FIG. 2 is a block diagram representing an exemplary remote computing device 220 interacting with a central service 240. The central service 240 may be an online service, for example. FIG. 2 depicts a submission of a request and payment provided (e.g., via a user, an input device, or another computing device) by the remote computing device 220, which may be a personal computer, for example, and/or comprise a restricted computing environment (e.g., game console, set-top box, cell phone, any computing appliance, etc.). The submission is transmitted or otherwise provided or outputted from the remote computing device 220 to the central service 240, via a cable, the Internet, or other communications network for example, for processing.

After the central service 240 receives the submission, the central service 240 desirably processes the submission and generates at least one unlock code or key. The unlock code or key is based on the originally received submission and the information contained therein. The central service 240 then transmits or otherwise provides the unlock code or key to the remote computing device 220. The unlock code may then be used to unlock an object. The object can be a software application, for example or more particularly, a portion of a key-limited use application. It is contemplated that the payment is not necessarily a monetary payment. For example, registering one's name and address could be the "payment" that is used to access the unlock code.

Figure 3:
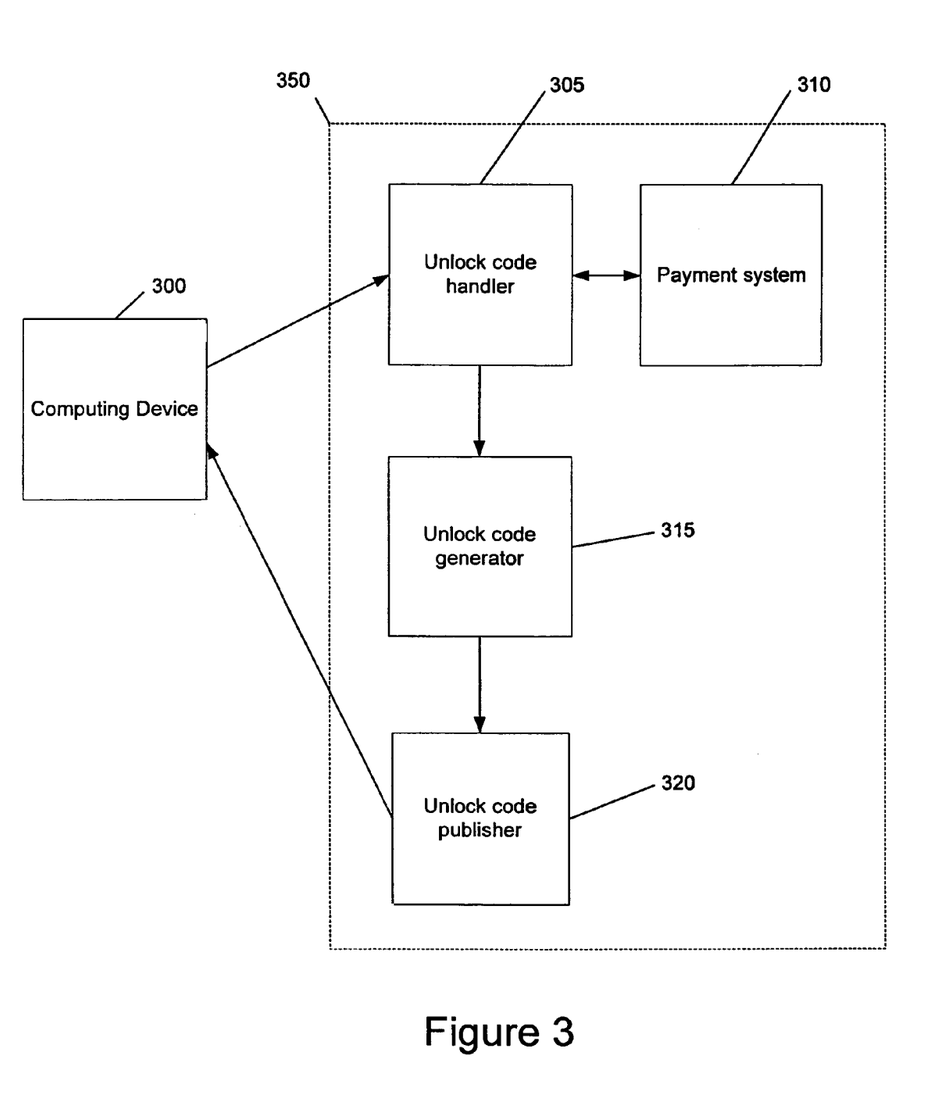
FIG. 3 is a block diagram of an exemplary system for obtaining an unlock code in accordance with the present invention.

FIG. 3 is a block diagram of an exemplary system for obtaining an unlock code in accordance with one embodiment of the present invention. FIG. 3 depicts an unlock control system 350. For illustrative purposes, the unlock control system 350 is shown to include an unlock code handler 305, a payment system 310, an unlock code generator 315, and an unlock code publisher 320. In practice, however, the unlock code handler 305, the payment system 310, the unlock code generator 315, and the unlock code publisher 320 may be combined into one or more components. A payment system 310 can be used to receive payment from a user for an object that is to be unlocked by the unlock control system 350.

Unlock code handler 305 is a computer-executable component that handles the unlocking process for objects, such as portions of key-limited use applications residing on, or used with, a computing device, such as computing device 300. Unlock code handler 305 is configured to process requests for licenses or unlock authorization for use on computing devices. For each request for a license or other authorization to use an object (e.g., locked software), the unlock code handler 305 facilitates the unlocking of the object.

When a request for unlocking an object is received, unlock code handler 305 is configured to receive the request and determine which unlock code or key is to be used to reveal either the entire object or portions thereof to be used on computing device 300. To do so, unlock code handler 305 may establish a communication link to the computing device 300 to receive the object identification (e.g., the title or serial number of a software program). Any type of wired or wireless network connection that enables unlock code handler 305 to obtain data from the computing device may be used to establish the communication link. For example, unlock code handler 305 may interact with the computing device through the Internet, a LAN, a wireless communication network, and the like.

Unlock code generator 315 is a computer-executable component that creates an unlock code that can unlock the entire object or portions thereof to be used on the computing device 300. The unlock code generator 315 receives a request from the unlock code handler 305 to generate an unlocking code for a specific object for use on the computing device 300. The unlock code is provided to the computing device 300, e.g., via the unlock code publisher 320 directly. For example, the unlock code publisher 320 may allow the user to download the software upgrade code through the Internet, or by some other similar delivery methods. It is contemplated that the key or unlock code is a data file that will desirably be maintained on the computing device. In some embodiments, merely the presence of such a data file will be enough to provide access to the unlocked (or upgraded or full, for example) version of the software or application. In such embodiments, it may not be desirable to verify the information in the data file prior to granting access to the unlocked version of the software or application. If the data file is not present, the software or application will desirably run in a restricted mode.

Once the unlocking code is downloaded, stored, or otherwise placed on the computing device 300, a digital signature is desirably assigned to the unlock code or key specific to the computing device 300. The digital signature can be generated by the computing device 300 itself. Alternatively, the digital signature may be generated by the unlock code control system 350 using, for example, an identifier unique to the computing device (e.g., its serial number). The assigning of the digital signature specific to the computing device 300 on the unlock code inhibits the transfer and use of the unlock code on other computing devices. A digital signature may be generated using well-known techniques.

The unlocking code can be stored in the memory of the computing device 300 so that the user is not burdened in the future with obtaining authorization to run the object that has already been licensed to that particular computing device 300. Thus, the unlocking code can be checked each time the program is launched. The program will operate fully only if the unlocking code, or other indicator that the software program has been properly licensed, is provided. It is noted that the object may be any application or portion of an application, such as a game, a level of a game, a feature of a game, etc.

Figure 4:
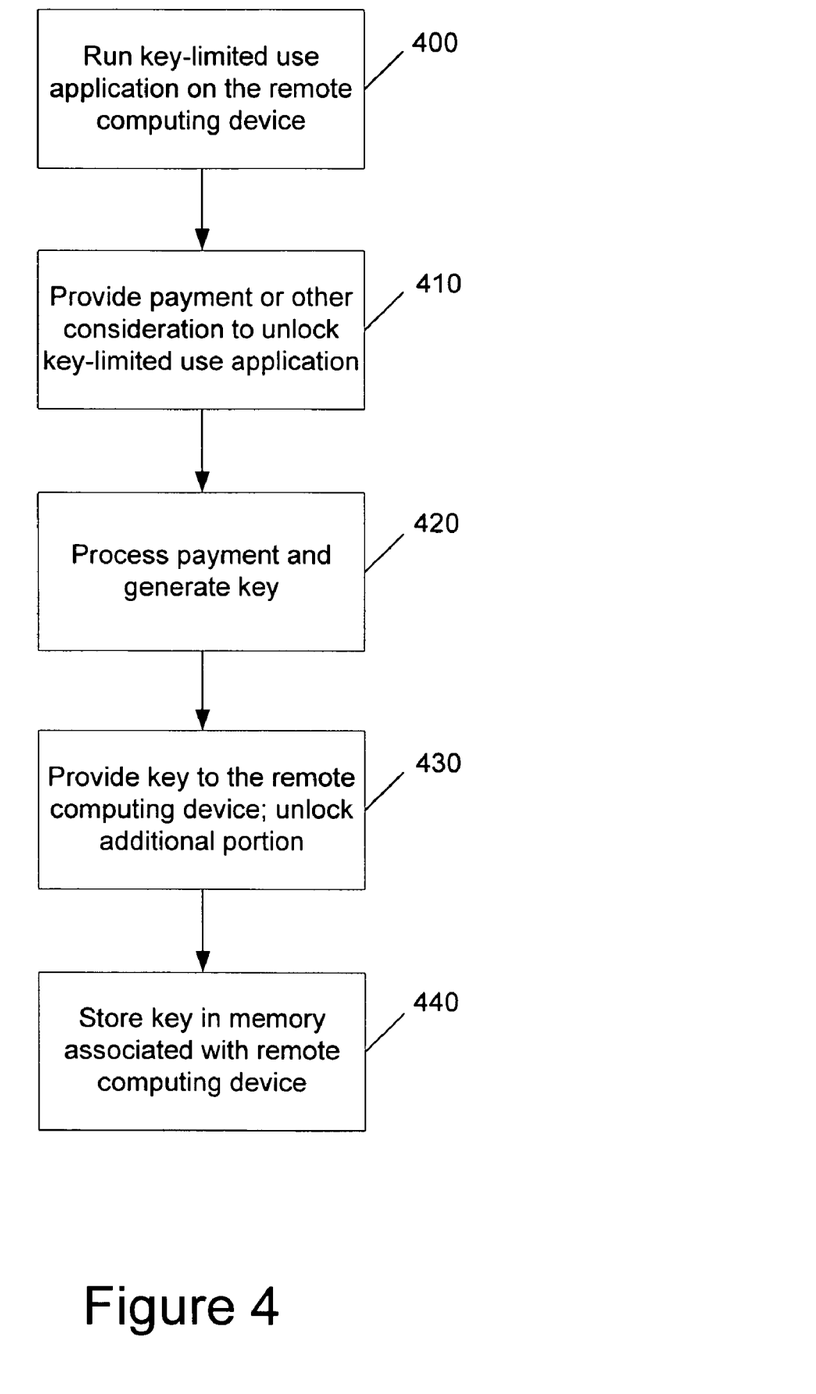
FIG. 4 is a flow diagram of an exemplary method of providing an unlock code in accordance with the present invention.

FIG. 4 is a flow diagram of an exemplary method of providing an unlock code or key for an application in accordance with the present invention. In this case, an object or application resides on a computing device, and a portion is useable (e.g., a demo version) and a portion is locked. At step 400, the user is able to run part of an application on a computing device, either because that part of the application was already licensed for that computing device (e.g., using the method described with respect to FIG. 5) or because that part of the application requires no license (i.e., it is free to use), for example. The remaining part of the application is locked and unavailable to the user. This may occur, for example, when a user receives a disk containing a demo and a full version of a software application and the full version remains locked until payment is received.

At step 410, the user may desire to unlock the application to gain access to additional features, etc., and thus provides payment (which may be monetary or something else such as a name and address) and an application identifier to the unlock code control system 350. The unlock code control system 350 processes the payment and generates a key or an unlock code, at step 420.

The unlock code or key is provided to the user and a computing device at step 430, which unlocks the additional feature or features. The unlock code or key, or other indicator, is desirably stored in non-volatile memory associated with the computing device, at step 440, so that the computing device may access the additional feature or features without further contact with the unlock code control system 350.

It is contemplated that a user may "rent" an unlock code or key, by purchasing a license for a particular application to run on a particular computing device for a particular amount of time (e.g., one week, one month, etc.). For example, the unlock code or key that is generated and provided may have an expiration time or date associated with it. The expiration period may be checked against a value residing on the computing device, or the computing device may have to check in with, or be connected to, an online service while the user is using the application on the computing device.

Figure 5:
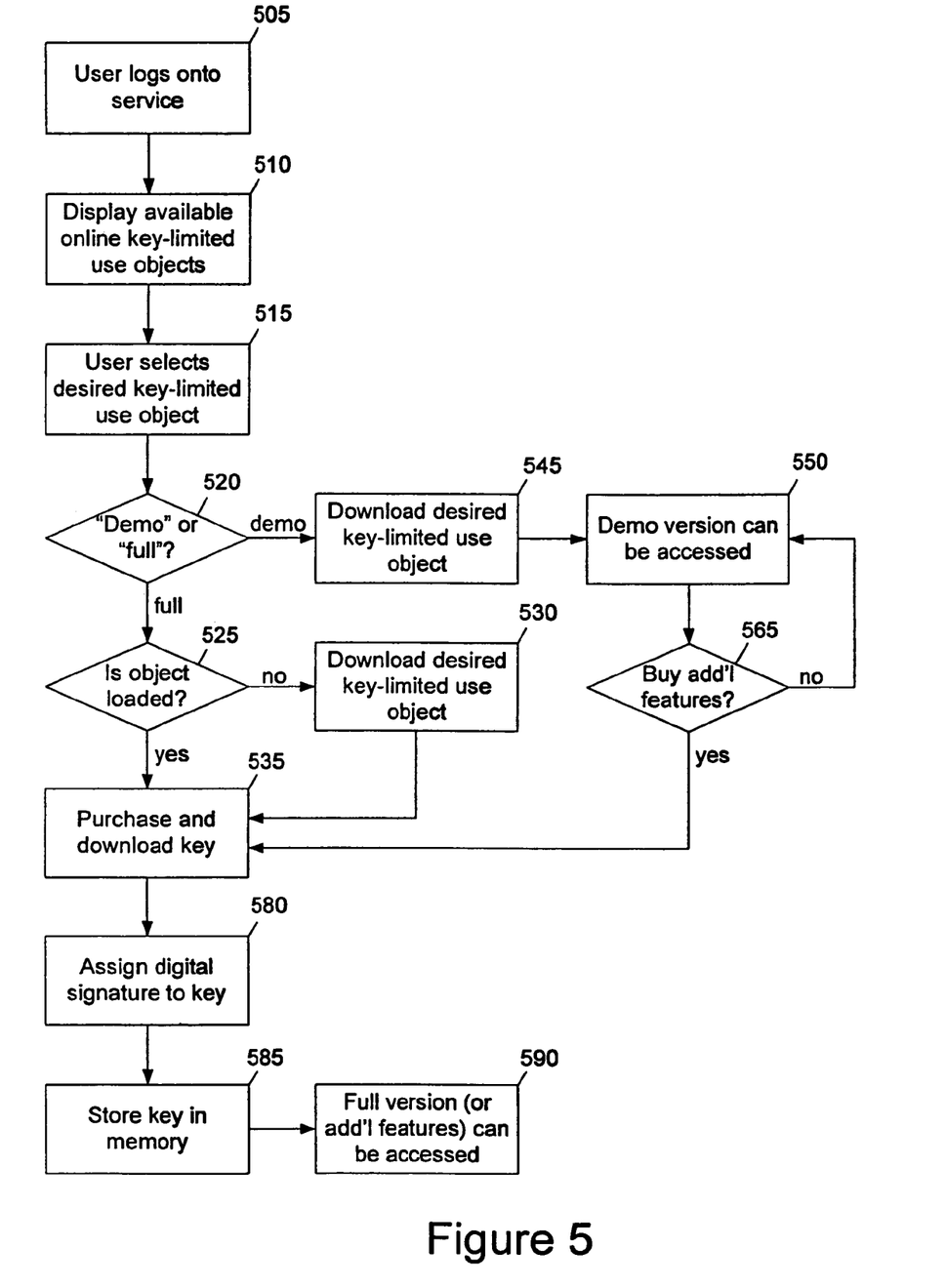
FIG. 5 is a flow diagram of an exemplary method of unlocking a key-limited use object in accordance with the present invention.

FIG. 5 is a flow diagram of an exemplary method of unlocking a key-limited use object in accordance with the present invention. In this exemplary embodiment, the computing device on which the unlock code or key is to be used does not always have to be connected to a network, such as the Internet.

A user desires to run an application or product on a computing device. Thus at step 505, a user logs on to an online service to review a menu of available online key-limited use objects at step 510. The user then can select an online key-limited use object from the menu at step 515 to download. The user may download either the demonstration "demo" version, which can be publicly available for little or no charge, or the user can download the "fill" version which includes the key and may only be available through a license agreement at step 535.

If the user selects the "demo" version, the user can download the key-limited use object at step 545 onto the computing device. Once the download is complete, the user can log off the online service, if desired, and use the "demo" version of the key-limited use object at step 550.

Subsequently, the user has the option to purchase and download the key to gain access to the full version, or larger portions thereof, of the content at step 565. If the user decides to purchase and download the key at step 565, the user can log back on to the online service, if previously logged off, and purchase and download the key at step 535.

At step 535, the computing device provides the product identifier (e.g., product code) of the key-limited use object that the user desires to activate to the online service via a network connection. In other embodiments, the central server, with permission of the user, may scan the computer for any key-limited use objects and keys and subsequently offer keys for any key-limited use object without a licensed key.

Once the key is downloaded at step 535, the key is desirably provided with a digital signature at step 580 to prevent subsequent transfer or use of the key on a second computing device. The assigning of a digital signature is an additional level of protection against piracy. After the key is assigned a digital signature, the key can be stored in the memory (e.g., a memory device associated with the computing device, such as a ROM, a memory unit, or a hard drive, for example). It may be desirable to store the key in persistent memory to remember that the product has been activated for the computing device, at step 585. In this manner, the computing device or central service desirably needs no further contact or interaction with the unlock code control system to run the key-limited use object in the future (e.g., at step 590). Desirably, such an unlock code would be encrypted and stored in a form that cannot be forged so that only the computing device (e.g., its CPU) could read it.

If the user initially selects to download the "full" version of the object or application at step 520, then the central server, in conjunction with the remote computing device, will desirably determine through a file search or by questioning the user, whether the key-limited use object is already loaded and present on the computing device at step 525. For example, if the persistent memory does not contain previously stored information pertaining to the key-limited use object and key, then a user interface, for example, may be provided to the user with instructions on how to download the key-limited use object or purchase the key for the computing device, at step 525. Alternately, additional instructions on how to proceed may be provided to the user.

If the key-limited use object is not loaded, then the user can download the key-limited use object onto the computing device at step 530. Once loaded, the user then can select to purchase and download the key at step 535. Processing may continue at step 580, as described above.

The user may, after downloading both the key-limited use object and the key, utilize the application pursuant to, for example, the license agreement of the key.

It is also contemplated that the control system, such as unlock code control system 350, can maintain a list of each application that is registered to an individual. Thus, if a computing device breaks or is stolen, for example, the replacement computing device can be activated with the programs originally registered on the original device. The control system would retrieve the list of unlock codes or keys associated with the individual and generate new codes for the new computing device and provide them to the user for use with the new computing device.

A website may be set up to allow a user to purchase the key or unlock codes for a software program for use on a particular computing device, and can show current key or unlock prices for the software programs. A website may also display the purchased codes for a particular user. This is useful if the console is ever reset (refurbished) or re-sold. A used computing device buyer will thus be able to access a list of the key or unlock codes for a computing device.

An exemplary system that provides the key or unlock codes can track sales, usage, etc., and thus can log statistics for the unlocked software programs, and provides an authoritative location for current pricing. This also allows the system to do royalty tracking/auditing for third party software publishers.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and system of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather should be construed in breadth and scope in accordance with the appended claims.

What is claimed:

1. A method for acquiring access to an application having a locked feature, the method comprising:
   launching an application on a computing device, the application comprising a locked portion and a non-locked portion, wherein the locked portion of the application is not accessible to the computing device when the application runs on the computing device unless a key for enabling access to said locked portion is present on the computing device, and wherein the non-locked portion of the application is accessible without the key;
   determining whether the key for enabling access to said locked portion of the application is present on the computing device; and
   when the key is present, running the application on the computing device in an unlocked mode of operation where the non-locked and locked portions of the application are accessible by the computing device, and
   when the key is not present, running the application on the computing device in a restricted mode of operation where the non-locked portion of the application is accessible and the locked portion is not accessible by the computing device.

2. The method of claim 1, wherein the key is a data file stored in a memory device on the computing device.

3. The method of claim 1, further comprising transferring a payment for the key prior to obtaining the key.

4. The method of claim 1, further comprising assigning a digital signature to the key.

5. The method of claim 4, wherein the digital signature prevents operation of the key in a second computing device.

6. The method of claim 1, further comprising the computing device requesting the key.

7. The method of claim 1, wherein the key is based on an identifier of the application.

8. The method of claim 1, wherein the computing device comprises a restricted computing environment operating in conjunction with an online service.

9. A computing device, comprising:
   a memory device for storing an application that comprises a locked portion and a non-locked portion, wherein the locked portion of the application is not accessible to the computing device when the application runs on the computing device unless a key for enabling access to said locked portion is present on the computing device, and wherein the non-locked portion of the application is accessible without the key; and
   a processor adapted to cause performance of acts including:
      launching the application on the computing device,
      determining whether the key for enabling access to said locked portion of the application is present on the computing device,
      when the key is present, running the application on the computing device in an unlocked mode of operation where the non-locked and locked portions of the application are accessible by the computing device, and
      when the key is not present, running the application on the computing device in a restricted mode of operation where the non-locked portion of the application is accessible and the locked portion is not accessible by the computing device.

10. The computing device of claim 9, wherein the processor is adapted to cause performance of further acts to receive payment instructions from an input device, and provide the payment to a remote payment system.

11. The computing device of claim 10, wherein the processor is adapted to cause performance of a further act to receive the key after providing payment to the remote payment system.

12. The computing device of claim 9, wherein the key comprises a digitally signed data file.

13. The computing device of claim 9, further comprising a restricted computing environment operating in conjunction with an online service.

14. A method for accessing an application, comprising acts of:
   storing a key-limited use application on a computing device, wherein at least a portion of the key-limited use application includes one or more locked features that require one or more corresponding keys to unlock and enable access to the one or more locked features when the application is run on the computing device;
   maintaining a key on the computing device, which is associated with the key-limited use application;
   launching the key-limited use application on the computing device; and
   using the key maintained on the computing device to unlock one or more of the locked features of the key-limited use application that correspond to said key; and
   running the key-limited use application on the computing device with one or more of the locked features being unlocked and accessible in accordance with the key maintained on the computing device.

15. The method of claim 14, wherein the key is a data file stored in a memory device on the computing device.

16. The method of claim 14, further comprising transferring a payment for the key.

17. The method of claim 14, wherein the computing device comprises a restricted computing environment operating in conjunction with an online service.

18. The method of claim 14, wherein the key is based on an identifier of the application.

19. The method of claim 14, further comprising assigning a digital signature to the key.

20. The method of claim 19, wherein the digital signature prevents operation of the key in a second computing device.

* * * * *